United States Patent
Barrenscheen

(10) Patent No.: US 8,908,782 B2
(45) Date of Patent: *Dec. 9, 2014

(54) METHOD AND APPARATUS FOR CHECKING ASYNCHRONOUS TRANSMISSION OF CONTROL SIGNALS

(71) Applicant: Infineon Technologies AG, Neubiberg (DE)

(72) Inventor: Jens Barrenscheen, Munich (DE)

(73) Assignee: Infineon Technologies AG, Neubiberg (DE)

( * ) Notice: Subject to any disclaimer, the term of this patent is extended or adjusted under 35 U.S.C. 154(b) by 0 days.

This patent is subject to a terminal disclaimer.

(21) Appl. No.: 13/716,233

(22) Filed: Dec. 17, 2012

(65) Prior Publication Data

US 2014/0010316 A1 Jan. 9, 2014

Related U.S. Application Data

(63) Continuation of application No. 12/561,310, filed on Sep. 17, 2009, now Pat. No. 8,335,277.

(51) Int. Cl.
*H04L 27/00* (2006.01)
*H04B 3/02* (2006.01)
*H04L 1/00* (2006.01)
*H04L 1/24* (2006.01)

(52) U.S. Cl.
CPC ............. *H04B 3/02* (2013.01); *H04L 1/0061* (2013.01); *H04L 1/243* (2013.01)
USPC .......................................... 375/259

(58) Field of Classification Search
CPC ............................. H04B 3/54; H04L 25/4902
USPC ............ 375/259, 295, 316; 332/109; 714/744
See application file for complete search history.

(56) References Cited

U.S. PATENT DOCUMENTS

| | | | |
|---|---|---|---|
| 7,793,021 B2 * | 9/2010 | Priel et al. | 710/106 |
| 8,335,277 B2 * | 12/2012 | Barrenscheen | 375/295 |
| 2005/0007443 A1 * | 1/2005 | Komiya et al. | 347/255 |
| 2005/0013114 A1 * | 1/2005 | Ha | 361/687 |
| 2007/0138987 A1 * | 6/2007 | Nishino et al. | 318/254 |

* cited by examiner

*Primary Examiner* — Khai Tran
(74) *Attorney, Agent, or Firm* — Infineon Technologies AG

(57) ABSTRACT

In a method for asynchronously transmitting control signals from a transmitter end to at least one receiver via a plurality of control lines, control signals received via the individual control lines are logically combined with one another at the receiver end and the result of the logic combination is transmitted to the transmitter end.

21 Claims, 4 Drawing Sheets

METHOD AND APPARATUS FOR CHECKING ASYNCHRONOUS TRANSMISSION OF CONTROL SIGNALS

FIELD OF THE INVENTION

The present invention relates to a method for checking asynchronous transmission of control signals and to apparatuses for carrying out the method.

BACKGROUND

Control signals must be interchanged between two or more components in many applications, special importance being attached to data integrity during transmission.

In the field of clock-controlled data transmission, it is known practice, in serial data transmission, for example in the CAN or FlexRay protocol, to form checksums over the transmitted data and to transmit said checksums together with the data. At the receiver end, it is thus possible to use the checksums to check the received data. In the case of clocked data transmission, it is generally known practice to form horizontal checksums over data transmitted in succession and to form vertical checksums over data transmitted in a parallel manner at the same time and to transmit said checksums together with the data to a receiver. In this case, for clock-controlled data transmission, it is necessary either to additionally transmit a clock to the receiver or to recover the clock at the receiver using a complicated circuit. Both disadvantageously constitute an outlay which is accepted only for complex systems.

SUMMARY OF THE INVENTION

According to one embodiment in a method for asynchronously transmitting control signals from a transmitter end to at least one receiver via a plurality of control lines, control signals respectively received via the individual control lines are logically combined with one another at the receiver end and the result of the logic combination is transmitted to the transmitter end.

According to a further embodiment a transmitter comprises control signal outputs for sending control signals to at least one receiver, at least one control signal input for receiving a signature signal and a checking device which is set up to check the signature signal on the basis of the control signals and a logic combination According to a further embodiment a receiver comprises at least one control signal input for receiving at least one control signal, a signature generator for asynchronously logically combining at least one received control signal and a signature output for asynchronously emitting a result of the logic combination.

Figure 1:
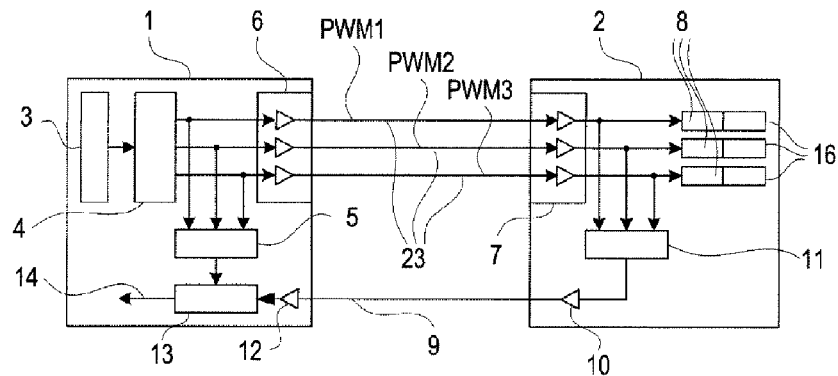
FIG. 1 schematically shows a circuit arrangement having a transmitter and a receiver between which control signals are transmitted according to one embodiment.

According to one embodiment, when asynchronously transmitting control signals from a transmitter end to at least one receiver via control lines, the control signals received via the control lines are logically combined with one another at the receiver end and the result of the logic combination is transmitted to the transmitter end. The control signals are transmitted in a parallel manner via the plurality of control lines and the control signals received via the individual control lines are logically combined with one another and the result is transmitted back to the transmitter end. This is carried out in an asynchronous manner, the logic combination not being carried out in a clock-controlled manner and thus being able to be carried out with a very short latency. The latency can be determined solely by the processing speed of the logic circuit involved or may also be set to a fixed predetermined value.

The received control signals are, in particular, continuously logically combined with one another. As a result, it is possible for the result of the logic combination to be available at least essentially immediately in the event of every state change of the received control signals and for said result to be transmitted to the transmitter end. The transmitter end can thus receive feedback for the transmission of the control signals with a very short delay and can very quickly determine errors in the transmission. The transmitter end can therefore react very quickly if an error has been determined in the transmission of the control signals and can, for example, stop the emission of further control signals or can change the at least one receiver to a safe state in which the at least one receiver does not carry out any actions or at least does not carry out any hazardous actions, for example.

As a result of the fact that the result is transmitted back to the transmitter end, it is possible to check at the transmitter end whether the transmission or the control lines has/have been subject to interference, in which case it is possible to detect both interference which results in incorrectly transmitted control signals and interference which interferes with the time of transmission.

The control signals may be, for example, pulse-width-modulated or pulse-duration-modulated control signals. Asynchronous control signals generally do not have a clock, with the result that they can change their state independently of a clock pattern. Since the receiver-end logic combination is applied to the control signals received via the individual control lines, the receiver-end logic combination can be carried out with a slight time delay for every state change of the control signals, with the result that the result of the receiver-end logic combination is immediately available and can be checked.

As a result of the fact that the receiver-end logic combination is carried out in an asynchronous manner, the result can also be transmitted to the transmitter end in an asynchronous manner and the control signals received via the signal lines can be checked in an asynchronous manner. It is thus possible to check both the error-free transmission of the state of the control signals, that is to say the information transmitted with the control signals, and the time of transmission.

The method makes it possible to check the transmission of, for example, PWM signals for power drivers or converters. Such signals have a very fine granularity or step size, with the result that the time of transmission must be able to be checked in a very precise manner. A step size of 50 ns, for example, results for a resolution of 10 bits for each PWM period and a frequency of 20 kHz. The method can also be used when controlling gate drivers.

The term transmitter end may also include a plurality of circuit components which are arranged at the transmitter end. This may be, for example, an individual transmitter or a transmitting device with an associated signature checking device, the signature checking device being able to be a circuit which is separate from the transmitting device. For example, a conventional transmitting device which is not suitable for carrying out the method can thus be retrofitted in order to carry out the method. For this purpose, the signature checking device is associated with a conventional transmitting device in such a manner that the control signals emitted by the transmitting device are read by the signature checking device and the result of the receiver-end logic combination, which is transmitted back from the at least one receiver, is received by the signature checking device. The signature checking device can check the received signature on the basis of the control signals. The result of this check can be transmitted from the signature checking device to the transmitting device or to another circuit. The signature checking device receives both the result of the receiver-end logic combination and the transmitted control signals and can thus check the result of the receiver-end logic combination on the basis of the control signals.

In one variant, the signature checking device may also receive a transmitter signature or the result of a transmitter-end logic combination of the control signature and the result of the receiver-end logic combination. In this variant, the signature checking device receives two signatures which can be used by said device to detect errors in the transmission of the control signals. The transmitter signature can be generated by a separate circuit or by a transmitting device. As a rule, the transmitter signature has a smaller bit width or generally requires fewer lines for transmission. If the transmitter signature is generated in a transmitting device and is output to a signature checking device, the line and connections of the circuits involved can be saved. The transmitter signature can thus be generated in the transmitting device.

Furthermore, the transmitter may also be a transmission driver circuit which receives control signals generated by a separate transmitting device and forwards them to the control lines. In this case, the transmission driver circuit also receives the result of the receiver-end logic combination, which result is transmitted from the at least one receiver. The transmission driver circuit checks this result of the receiver-end logic combination on the basis of the control signals.

In one embodiment, checking of the result of the receiver-end logic combination is suspended for a particular period of time. This makes it possible to take into account delays in the receiver-end logic combination and/or in the transmission of the result of the receiver-end logic combination. Despite transmission without interference, such delays could otherwise result in an indication of transmission interference.

In particular, state changes of the control signals are detected and the checking of the result of the receiver-end logic combination is suspended for a particular period of time following each state change. Since the check takes place at the transmitter end, the state changes are preferably carried out in the transmitter or in the device which receives the result of the receiver-end logic combination and checks said combination on the basis of the transmitted control signals.

The circuit arrangement schematically illustrated in FIG. 1 shows a transmitter 1 and a receiver 2 which are connected to one another via three control lines 23 which each transmit one of three control signals PWM1-PWM3. The control signals PWM1-PWM3 are generated by a PWM generator 4 in the transmitter 1, which generator is controlled by a regulating means 3 in the transmitter 1. The control signals PWM1-PWM3 generated by the PWM generator 4 are passed to a control signal output 6 of the transmitter 1 and to a transmitter-end signature generator 5 in the transmitter 1. The control signal output 6 has a plurality of output drivers or output connections which are each connected to one of the control lines 23.

The transmitter-end signature generator 5 logically combines the control signals PWM1-PWM3 with one another and transmits the result of this transmitter-end logic combination to a signature checking device 13 in the transmitter 1. The result of the transmitter-end logic combination is also referred to as the transmitter signature below.

The receiver 2 has a control signal input 7 having a plurality of input stages or input connections which are each connected to one of the control lines 23. The control signal input 7 forwards the received control signals PWM1-PWM3 to a receiver-end signature generator 11 in the receiver 2 and to drivers 8 in the receiver 2. The drivers 8 amplify the control signals PWM1-PWM3 and forward them, in amplified form, to respective switches 16 in the receiver 2 which energize loads, for example, or generally perform control tasks on the basis of the respective control signal PWM1-PWM3.

The receiver-end signature generator 11 logically combines the received control signals PWM1-PWM3 with one another and transmits the result of this receiver-end logic combination to a signature output 10 of the receiver 2. The result of the receiver-end logic combination is also referred to as the receiver signature below. The signature output 10 is connected to a signature input 12 of the transmitter 1 via a signature line 9. The signature output 10 and the signature input 12 are depicted as a driver and an input stage, respectively, in the figures. The term input or output generally also includes circuit parts which are involved in reception or transmission such as output drivers or input stages. Inputs may also include comparators, for example Schmitt triggers, in order to shape received digital signals.

The receiver-end signature generator 11 is set up to logically combine the received control signals PWM1-PWM3 with one another without delay. The result of the receiver-end logic combination is emitted on the signature line 9 in an asynchronous manner.

The signature input 12 of the transmitter 1 is connected to the signature checking device 13 which thus receives the receiver signature and the transmitter signature. The signature checking device 13 compares both signatures and outputs an error signal 14 if the receiver signature differs from the transmitter signature. The transmitter-end signature generator 5 and the receiver-end signature generator 11 are set up in such a manner that they carry out the same logic combination, with the result that the transmitter signature is the same as the receiver signature when there is no interference. In one variant, the two signature generators 5, 11 may also carry out different logic combinations, the receiver signature and the transmitter signature being able to differ from one another in this case and the signature checking device having to take into account the different logic combinations. For this purpose, the signature checking device 13 must have knowledge of the two logic combinations at the transmitter end and at the receiver end or must have knowledge of at least the difference between the two logic combinations in so far as the difference is relevant to the comparison of the transmitter signature and the receiver signature. The transmitter-end signature generator 5 may also be combined with the signature checking device 13 to form a checking device.

The signature checking device 13 is also set up to suspend the comparison of the transmitter signature and the receiver signature for a particular period of time following a state change of the transmitter signature in order to avoid generating an incorrect error signal 14 on account of time delays. The comparison can also be suspended by inhibiting or suppressing the error signal 14 for this period of time.

Figure 2:
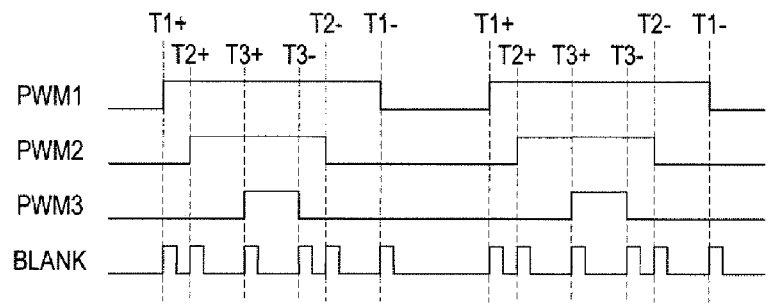
FIG. 2 shows the temporal profile of the control signals in the circuit arrangement from FIG. 1, FIG. 3 schematically shows a circuit arrangement having a plurality of receivers according to another embodiment, FIG. 4 schematically shows a circuit arrangement having a transmitter and a receiver according to another embodiment, FIGS. 5-7 schematically show receivers according to further embodiments, FIG. 8 schematically shows a transmitter according to one embodiment in which the control signals are generated in a redundant manner.

FIG. 2 shows the temporal profiles of the control signals PWM1-PWM3 and a suspension signal BLANK which indicates when the comparison of the transmitter signature and the receiver signature is suspended. The control signals PWM1-PWM3 and the suspension signal BLANK are digital signals which can assume a high state and a low state. The times at which the control signals PWM1-PWM3 can change their state are independent of a fixed T time pattern. A time at which the first control signal PWM1 changes its state is indicated using T1+ for a change from low to high and using T1− for a change from high to low. The times for the other control signals PWM2, PWM3 are accordingly indicated using T2+ and T2− and T3+ and T3−, respectively.

For each state change of at least one control signal PWM1-PWM3, the suspension signal BLANK changes from low to high for a predetermined suspension period. After the suspension period has elapsed, the suspension signal changes from high to low again. The suspension period is such that the transmission of the control signals PWM1-PWM3, the generation of the receiver signature and the transmission of the latter back to the transmitter 1 have been reliably concluded inside this period. As a rule, only gate delay times need to be taken into account in this case, with the result that the suspension period may be in the range of a few microseconds or nanoseconds, for example.

Figure 3:
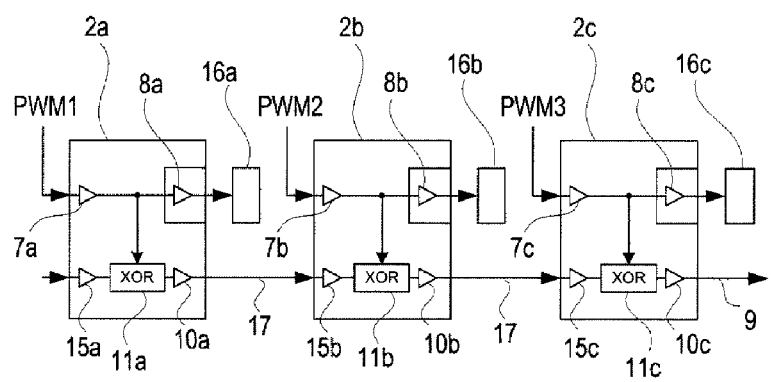

FIG. 3 shows one exemplary embodiment in which the control signals PWM1-PWM3 are transmitted to a plurality of receivers 2a-2c. Each receiver 2a-2c has a control signal input 7a-7c and receives a control signal PWM1-PWM3 via the latter. Each receiver 2a-2c also has a driver 8a-8c which generates a driver signal on the basis of the respective received control signal PWM1-PWM3, which driver signal is passed from the respective receiver to a respective one of three switches 16a-16c. As in the previous exemplary embodiment, the switches 16a-16c are generally used for control tasks.

Each receiver 2a-2c has a signature generator 11a-11c, a signature input 15a-15c and a signature output 10a-10c. The signature generator 11a-11c in each receiver 2a-2c receives the control signal received by the respective receiver 2a-2c and the signature signal received by the respective receiver 2a-2c at the respective signature input 15a-15c.

The receivers are set up in such a manner that, if a signature signal is not received at the signature input 15a-15c, the signature generator 11a-11c uses a standard signal at the corresponding input. This may be effected by providing a pull-up or pull-down resistor which pulls an open signature input 15a-15c, or a signature input 15a-15c which has not been connected, to a fixed potential and thus ensures a standard value at this input.

The receivers 2a-2c are connected in series, for which purpose the signature output 10a, 10b of one receiver 2a, 2b is connected to the signature input 15b, 15c of a receiver 2b, 2c which follows in the series via a signature ring line 17. The signature input 15a of the receiver 2a which is first in the series is not connected. The signature output 10c of the receiver 2c which is last in the series is connected to the signature input 12 of the transmitter 1 via the signature line 9.

As a result of the fact that the individual receivers 2a-2c are connected in series via the signature outputs 10a-10b or the signature inputs 15b-15c, a receiver signature can be generated using a plurality of control signals PWM1-PWM3 even if the control signals PWM1-PWM3 are transmitted to different receivers 2a-2c. In this case, the control signals PWM1-PWM3 need not belong together or be related to one another. The result of the logic combination of all received control signals PWM1-PWM3 is transmitted back to the transmitter end, with the result that the transmission of all control signals PWM1-PWM3 even to a plurality of separate receivers 2a-2c can be checked using a single signal which is transmitted back.

Figure 4:
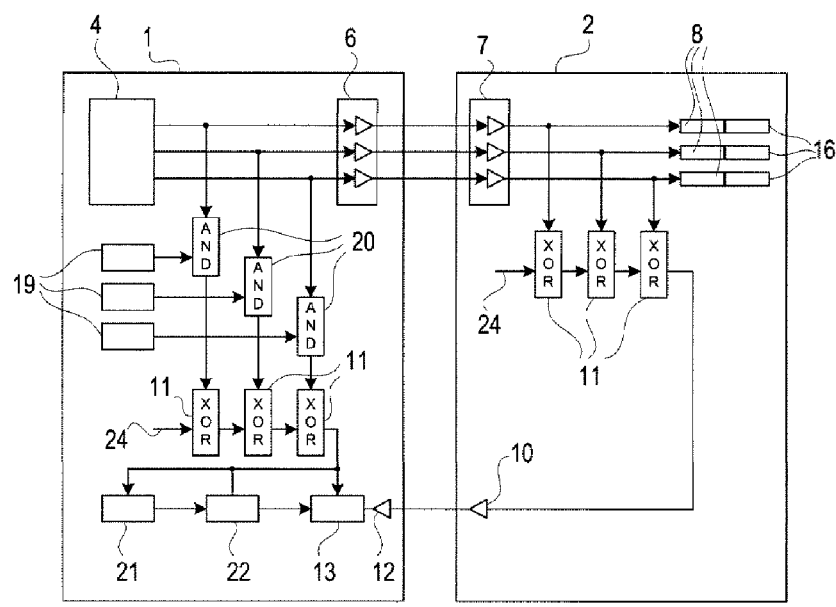

FIG. 4 shows another exemplary embodiment of a transmitter 1 and a receiver 2. In this exemplary embodiment, the transmitter 1 likewise has a PWM generator 4 and a control signal output 6, the PWM generator 4 generating the control signals PWM1-PWM3 and delivering them to the control signal output 6 which transmits them to the control signal input 7 of the receiver 2 via control lines. The transmitter 1 also has AND gates 20 and selection switches 19. One input of each of the AND gates 20 is connected to a control signal PWM1-PWM3 and the other input is connected to the output of a selection switch 19. The outputs of the AND gates 20 are connected to inputs of exclusive-OR gates or XOR gates 11 which are connected in series. The selection switches 19 thus control whether a control signal PWM1-PWM3 is forwarded from the AND gates 20 to the inputs of the XOR gates 11.

The XOR gate 11 which is connected first in the series receives a control signal PWM1 and a standard value 24, which may be high or low, at its inputs. The output of this XOR gate 11 is connected to an input of the XOR gate 11 which follows it in the series. The output of the XOR gate 11 which is connected last in the series thus provides the result of the transmitter-end logic combination and thus the transmitter signature. As a result, it is possible to set which control signals or internal control signal lines are taken into account when generating the transmitter signature. A transmitting device may thus be set up to generate a particular number of control signals. If, depending on use, not all of the control signals are required, the generation of the transmitter signature may be restricted to the control signals used. It is thus possible to create standard versions of the transmitting device which are each designed for a particular number of control signals, not all of which have to be used, however.

The transmitter 1 also has a signature checking device 13, an edge detection device 21 and a suspension timing element 22. An output of the edge detection device 21 is connected to an input of the suspension timing element 22 which is in turn connected to the signature checking device 13. The signature checking device also receives, via a signature input 12 of the transmitter 1, a receiver signature transmitted from the receiver 2 and is set up to compare the transmitter signature with the receiver signature.

The transmitter signature is passed to the edge detection device 21 and the signature checking device 13. The edge detection device 21 detects the edges of the transmitter signature and thus every change of the transmitter signature. The suspension timing element 22 is started after every detected edge in order to transmit a particular signal to the signature checking device 13 for a particular suspension period in order to interrupt or suspend the comparison of the transmitter signature and the receiver signature in the signature checking device 13 for this suspension period.

As in the previous exemplary embodiment according to FIG. 1, the receiver 2 has a control signal input 7 for receiving the control signals PWM1-PWM3. The control signal input 7 forwards the control signals PWM1-PWM3 to drivers 8 and to a series of XOR gates 11. As in the exemplary embodiment from FIG. 1, the drivers 8 are connected to switches 16. Like in the transmitter 1, the XOR gates 11 are connected to form a series which receives a standard value 24 at the start and provides the result of a logic combination, which is the receiver signature in this case, at the end. The series of XOR gates 11 provides the result of an XOR combination of all control signals PWM1-PWM3 and the standard value 24 both in the transmitter 1 and in the receiver 2. The receiver signature is passed to the signature input 12 of the transmitter 1 via a signature output 10 of the receiver and a signature line 9. As a rule, there is no need for a selection circuit at the receiver end since the receiver, as a rule, is specially designed for a function and does not contain any unused control signal lines in this design.

Figure 5:
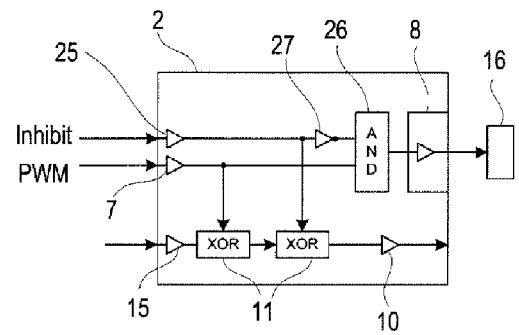

FIG. 5 shows another exemplary embodiment of a receiver 2. In this variant, the receiver 2 is likewise suitable for use with other receivers 2, all receivers 2 being connected in series via respective signature outputs 10 and respective signature inputs 15. For this purpose, the receiver 2 has a signature input 15, two XOR gates 11 and a signature output 10 which are each connected in series. The receiver 2 also has a control signal input 7 for a single control signal PWM and an inhibit input 25 for receiving an inhibit signal Inhibit which can be used to inhibit operation of the receiver 2. The control signal input 7 is directly coupled to a first input of an AND gate 26 having two inputs, to the second input of which the inhibit input 25 is coupled via an inverter 27. The output of the AND gate 26 is connected to a driver 8 whose output signal is passed to a switch 16 outside the receiver 2.

The two XOR gates 11 have two further inputs which receive the control signal PWM and the inhibit signal Inhibit, with the result that the XOR gates 11 carry out an XOR combination of the signature signal received via the signature input 15, the control signal PWM received via the control signal input 7 and the inhibit signal Inhibit received via the inhibit input 25 and transmit the result of this combination, via the signature output 10, to a receiver 2 connected downstream in the series or to the transmitter end if the receiver 2 is last in the series. In this exemplary embodiment, it is possible to check the functionality of the transmission of both the control signal PWM and the inhibit signal Inhibit without generating a controlling signal at the output of the driver 8. If the inhibit signal Inhibit is low or inactive, the signature signal output can be changed by changing the control signal PWM, which change in the signature signal can be evaluated at the transmitter end without an active signal appearing at the output of the driver 8. Conversely, the control signal PWM can be kept at low and the inhibit signal Inhibit can be changed. In this case too, the signature signal is changed and can be evaluated at the transmitter end without an active signal appearing at the output of the driver 8.

Figure 6:
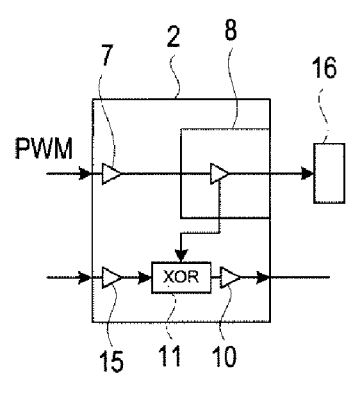

FIG. 6 shows another exemplary embodiment of a receiver 2. As in the previous exemplary embodiments, the receiver 2 has a signature input 15, a signature output 10, a control signal input 7, a driver 8 and an XOR gate 11. The driver 8 is connected to a switch 16 outside the receiver 2. In this case, the XOR gate 11 does not receive the control signal PWM but rather a status signal or checking signal from the driver 8. The status signal generally indicates a state of the driver 8, for example a flow of current or a voltage in the driver 8. The response of the driver 8 to the control signal PWM can be checked using the status signal. The status signal may thus be an output voltage of the driver 8. The XOR gate 11 logically combines a received signature signal and the status signal with one another and emits the result via the signature output 10. The further processing of the control signal inside the receiver 2 can be checked using the status signal or checking signal.

Figure 7:
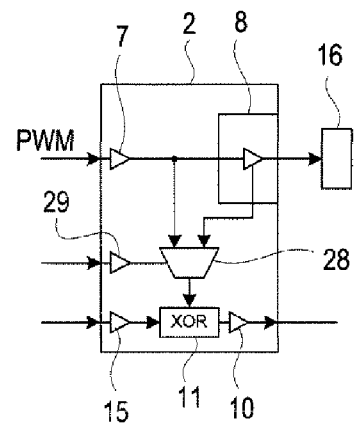

FIG. 7 shows a variant of the exemplary embodiment according to FIG. 6, which variant additionally has a multiplexer 28 which has two inputs and is controlled by a configuration signal at the configuration input 29. The output of the multiplexer 28 is connected to the XOR gate 11. One input of the multiplexer 28 receives the control signal PWM and one input of the multiplexer 28 receives the status signal of the driver 8. The multiplexer 28 can be used to set whether a received signature signal is logically combined with the control signal PWM or with the status signal instead.

Figure 8:
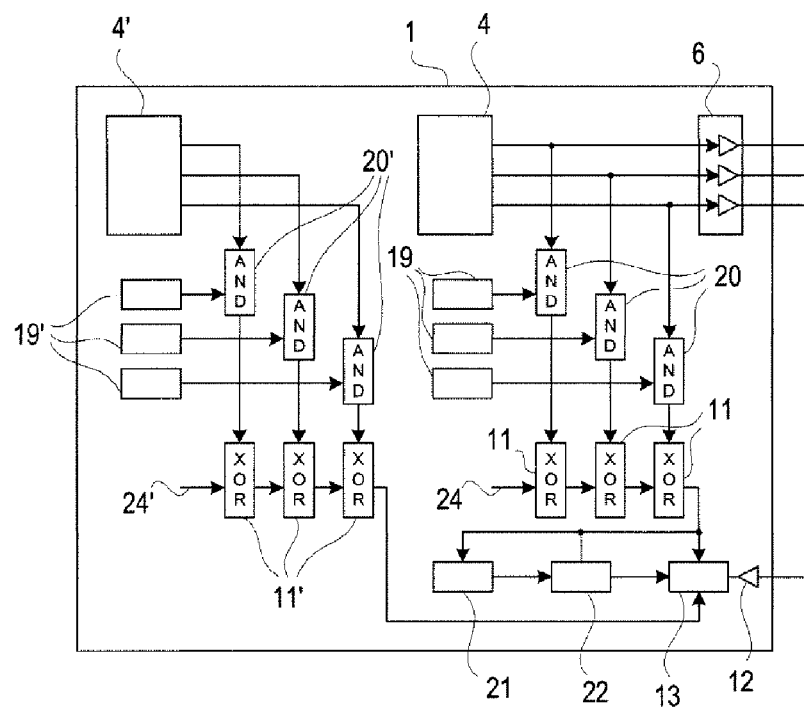

FIG. 8 shows a variant of the exemplary embodiment according to FIG. 4, in which variant all components, with the exception of the edge detection device 21, the suspension timing element 22 and the signature checking device, are provided in a redundant manner. The redundant components are provided with the same reference numerals but are followed by an apostrophe. The two PWM generators 4, 4' generate the same control signals PWM1-PWM3 and both selection switches 19, 19' are set in the same manner. The same transmitter signature is thus generated at the output of the two series of XOR gates 11, 11' during proper operation. The redundant transmitter signature at the output of the series of XOR gates 11 is passed to the signature checking device 13. The signature checking device 13 thus compares the receiver signature, the transmitter signature and the redundant transmitter signature and can thus detect interference in the transmission of the control signals to the at least one receiver and also interference at the transmitter end.

Figure 9:
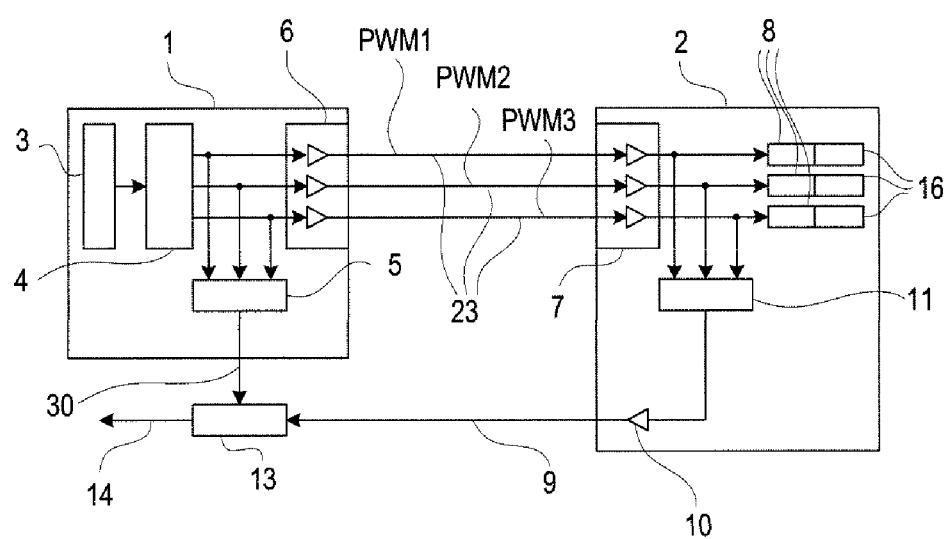
FIG. 9 shows a system comprising a transmitter, a receiver and a separate signature checking device for transmitting asynchronous control signals according to another embodiment.

FIG. 9 shows a variant of the system according to FIG. 1 with a transmitter 1, a receiver 2 and an external signature checking device 13. In this exemplary embodiment, the transmitter 1 has a signature output 30 for outputting the transmitter signature generated by the signature generator 5 in the transmitter 1. The receiver signature at the signature output 10 of the receiver 2 is in this case passed, via the signature line 9, to the external signature checking device 13 which thus receives the transmitter signature and the receiver signature, compares said signatures and provides an error signal 14 on the basis of the comparison. The transmitter signature advantageously requires fewer lines for transmission than the receiver signature. In particular, the transmitter signature has a width of one bit, with the result that it can be transmitted via one line.

The invention claimed is:

1. A method for asynchronously transmitting pulse-width-modulated or pulse-duration-modulated control signals from a transmitter to at least one receiver via a plurality of control lines, the method comprising:
    receiving at the at least one receiver the control signals respectively via the individual control lines; and
    combining logically the received pulse-width-modulated or pulse-duration-modulated control signals with one another at the at least one receiver and transmitting the result of the logic combination to the transmitter.

2. The method according to claim 1, wherein the control signals are digital.

3. The method according to claim 1, wherein the received control signals are digitized before the logic combination.

4. The method according to claim 1, wherein the logic combination is an exclusive-OR combination.

5. The method according to claim 1, wherein the result of the logic combination is generated in an asynchronous manner and is transmitted to the transmitter end in an asynchronous manner.

6. The method according to claim 1, wherein the control signals are transmitted to a plurality of receivers, and each receiver logically combines the respective control signal received by each receiver with a respective signature signal received by each receiver via a signature input and outputs the result of the logic combination in the form of a signature signal via a signature output.

7. The method according to claim 6, wherein the signature signal generated by a receiver is transmitted to the transmitter end.

8. The method according to claim 6, wherein the receivers are connected in series via signature lines the signature lines respectively connecting the signature output of one receiver to the signature input of the receiver which follows in the series, and the signature output of the receiver which is last in the series is connected to a signature input of the transmitter end via a signature line.

9. The method according to claim 1, wherein the result of the receiver-end logic combination is checked using the transmitted control signals and the type of receiver-end logic combination.

10. The method according to claim 9, wherein the transmitter end logically combines the control signals at the transmitter end in the same manner as the at least one receiver, and the result of the transmitter-end logic combination is compared with the result of the receiver-end logic combination.

11. The method according to claim 9, wherein the checking of the result of the receiver-end logic combination is suspended during a particular period of time.

12. The method according to claim 9, wherein state changes of the control signals or a measure of state changes of the control signals is detected, and the checking of the receiver-end result of the logic combination is suspended during a particular period of time following a state change of the control signals.

13. The method according to claim 1, wherein the at least one receiver generates checking signals on the basis of received control signals, the receiverend logic combination is applied to the checking signals, and the result of the receiver-end logic combination is transmitted to the transmitter end.

14. The method according to claim 13, wherein the at least one receiver generates precisely one checking signal for each control signal by applying a logical operation to the respective control signal.

15. The method according to claim 13, wherein the checking signals is generated on the basis of status feedback signals which describe states of operations controlled by received control signals.

16. The method according to claim 1, wherein the result of the receiver-end logic combination is a single-bit value.

17. The method according to claim 1, wherein the at least one receiver has a signature input and logically combining the received control signals and the signature signal received via the signature input at the receiver end when a signature signal is applied to the signature input and logically combines the received control signals and a standard value at the receiver end when a signature signal is not applied to the signature input.

18. The method according to claim 1, wherein the control signals are generated in a redundant manner, a first set of control signals and a second set of control signals are generated and both sets of control signals respectively are logically combined with one another.

19. A transmitter comprising control signal outputs for sending pulse-width-modulated or pulse-duration-modulated control signals to at least one receiver, at least one control signal input for receiving a signature signal and a checking device which is set up to check the signature signal on the basis of the control signals and a logic combination.

20. A transmitter according to claim 19, wherein the logic combination is a receiver-end logic combination which is applied to the control signals received by the at least one receiver in the at least one receiver.

21. A method for asynchronously transmitting control signals from a transmitter to at least one receiver via a plurality of control lines, the method comprising:
   receiving at the at least one receiver the control signals respectively via the individual control lines; and
   combining logically the control with one another at the at least one receiver and transmitting the result of the logic combination to the transmitter,
   wherein each receiver logically combines the respective control signal received by it with a respective signature signal received by it via a signature input and outputs the result of the logic combination in the form of a signature signal via a signature output.

* * * * *